(12) United States Patent
Kalina

(10) Patent No.: US 7,264,654 B2
(45) Date of Patent: Sep. 4, 2007

(54) PROCESS AND SYSTEM FOR THE CONDENSATION OF MULTI-COMPONENT WORKING FLUIDS

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 603 days.

(21) Appl. No.: 10/669,173

(22) Filed: Sep. 23, 2003

(65) Prior Publication Data

US 2005/0061654 A1 Mar. 24, 2005

(51) Int. Cl.
*B01D 5/00* (2006.01)
*F25B 43/00* (2006.01)

(52) U.S. Cl. ............................ 95/228; 96/243; 62/600; 62/606

(58) Field of Classification Search ................ 95/149, 95/228, 229; 96/242, 243, 266; 62/600, 62/606
See application file for complete search history.

(56) References Cited

U.S. PATENT DOCUMENTS

| | | | | |
|---|---|---|---|---|
| 3,696,587 A | * | 10/1972 | Young et al. ................ | 95/93 |
| 4,010,246 A | * | 3/1977 | Steinrotter et al. ......... | 423/542 |
| 4,183,225 A | * | 1/1980 | Politte et al. ................ | 62/114 |
| 4,346,561 A | | 8/1982 | Kalina ......................... | 60/641.6 |
| 4,489,563 A | | 12/1984 | Kalina ......................... | 60/673 |
| 4,548,043 A | | 10/1985 | Kalina ......................... | 60/649 |
| 4,586,340 A | | 5/1986 | Kalina ......................... | 60/649 |
| 4,604,867 A | | 8/1986 | Kalina ......................... | 60/653 |
| 4,674,285 A | | 6/1987 | Durrant et al. ............... | 10/646 |
| 4,732,005 A | | 3/1988 | Kalina ......................... | 60/649 |
| 4,763,480 A | | 8/1988 | Kalina ......................... | 60/678 |
| 4,899,545 A | | 2/1990 | Kalina ......................... | 60/673 |
| 4,982,568 A | | 1/1991 | Kalina ......................... | 60/649 |
| 5,029,444 A | | 7/1991 | Kalina ......................... | 60/673 |
| 5,095,708 A | | 3/1992 | Kalina ......................... | 60/673 |
| 5,440,882 A | | 8/1995 | Kalina ......................... | 60/641.2 |
| 5,450,821 A | | 9/1995 | Kalina ......................... | 122/1 R |
| 5,572,871 A | | 11/1996 | Kalina ......................... | 60/649 |
| 5,588,298 A | | 12/1996 | Kalina et al. ................ | 60/676 |
| 5,603,218 A | | 2/1997 | Hooper ........................ | 60/655 |
| 5,649,426 A | | 7/1997 | Kalina et al. ................ | 60/649 |
| 5,754,613 A | | 5/1998 | Hashiguchi et al. ........ | 376/378 |
| 5,797,981 A | * | 8/1998 | Collin et al. ................. | 95/174 |

(Continued)

FOREIGN PATENT DOCUMENTS

DE 3933731 A1 * 4/1990

OTHER PUBLICATIONS

U.S. Appl. No. 11/514,290, filed Aug. 31, 2006, Kalina.

(Continued)

*Primary Examiner*—Frank M. Lawrence
(74) *Attorney, Agent, or Firm*—Robert W Strozier

(57) ABSTRACT

A process and system for condensing a multi-component fluid is disclosed, where the process and system are designed to provide a substantial increase in a heat transfer coefficient during condensation of multi-component fluids resulting in a drastic reduction in size and cost of heat exchangers need to condense such fluids. The system and method includes a plurality of heat exchangers and at least one scrubber and splitters and mixers supporting streams that allow a mixed stream to be supplied to each heat exchange unit having parameters designed to increase, optimize or maximize the heat transfer coefficient in each heat exchanger.

28 Claims, 6 Drawing Sheets

U.S. PATENT DOCUMENTS

| | | | |
|---|---|---|---|
| 5,822,990 A | 10/1998 | Kalina et al. | 60/649 |
| 5,950,433 A | 9/1999 | Kalina | 60/649 |
| 5,953,918 A | 9/1999 | Kalina et al. | 60/653 |
| 6,015,451 A * | 1/2000 | Anderson et al. | 95/184 |
| 6,347,520 B1 | 2/2002 | Ranasinghe et al. | 60/649 |
| 6,735,948 B1 | 5/2004 | Kalina | 60/649 |
| 6,769,256 B1 | 8/2004 | Kalina | 60/653 |
| 6,820,421 B2 | 11/2004 | Kalina | 60/649 |
| 6,829,895 B2 | 12/2004 | Kalina | 60/649 |
| 6,910,334 B2 | 6/2005 | Kalina | 60/651 |
| 6,923,000 B2 | 8/2005 | Kalina | 60/649 |
| 6,941,757 B2 | 9/2005 | Kalina | 60/649 |
| 6,968,690 B2 | 11/2005 | Kalina | 60/649 |
| 7,021,060 B1 | 4/2006 | Kalina | 60/649 |
| 7,043,919 B1 | 5/2006 | Kalina | 60/651 |
| 7,055,326 B1 | 6/2006 | Kalina | 60/649 |
| 7,065,967 B2 | 6/2006 | Kalina | 60/649 |
| 7,065,969 B2 | 6/2006 | Kalina | 60/670 |
| 2004/0069015 A1* | 4/2004 | Paradowski | 62/620 |
| 2006/0096288 A1 | 5/2006 | Kalina | 60/649 |
| 2006/0096290 A1 | 5/2006 | Kalina | 60/649 |
| 2006/0165394 A1 | 7/2006 | Kalina | 392/386 |
| 2006/0199120 A1 | 9/2006 | Kalina | 431/9 |

OTHER PUBLICATIONS

U.S. Appl. No. 11/399,287, filed Apr. 5, 2006, Kalina.
U.S. Appl. No. 11/399,306, filed Apr. 5, 2006, Kalina.
U.S. Appl. No. 11/238,173, filed Sep. 28, 2005, Kalina.
U.S. Appl. No. 11/235,654, filed Sep. 22, 2005, Kalina.
U.S. Appl. No. 11/227,991, filed Sep. 15, 2005, Kalina.

* cited by examiner

PROCESS AND SYSTEM FOR THE CONDENSATION OF MULTI-COMPONENT WORKING FLUIDS

BACKGROUND OF THE INVENTION

1. Field of the Invention

The present invention relates to a process and system for condensing a multi-component fluid, where the process and system are designed to provide a substantial increase in a heat transfer coefficient during condensation of multi-component fluids resulting in a drastic reduction in size and cost of heat exchangers need to condense such fluids.

More particularly, the present invention relates to a process and system for condensing a multi-component fluid, where the process and system are designed to provide a substantial increase in a heat transfer coefficient during condensation of multi-component fluids resulting in a drastic reduction in size and cost of heat exchange units need to condense the fluids and includes at least two heat transfer stages and at least one scrubber interconnected so that streams are split and mixed in such a way as to increase the heat transfer coefficient in each heat exchange unit.

2. Description of the Related Art

The condensation of multi-component working fluids is widely used in the chemical, petro-chemical, refrigeration and power industries. It is important to note that the efficacy of this process is substantially lower than the efficacy of condensation of pure, single component fluids. In the process of condensation of single component fluids, the only thermal resistance is the thermal resistance of the film of condensate that covers the cooling surface. The temperature of this film is the same as the temperature of the whole condensing stream and therefore the temperature difference across the film of condensate is equal to the temperature difference between the temperature of the condensing steam and the temperature of the cooling surface.

In distinction to the process of the condensation of single component fluid, the process of condensing multi-component fluids occurs at variable temperatures and includes distinct sub-processes which occur simultaneously. Condensation occurs on a cooling surface which is covered by a film of condensate. Vapor which is not yet condensed is absorbed by this the surface of this film of condensate. The remaining non-condensed, portion of vapor is cooled by the surface of the film of condensate. In turn, the film of condensate is cooled by the cooling surface. The entire stream of heat removed from the fluid is therefore passing though the film of condensate, whereas only a portion of this stream, i.e., heat released in phase change and sensible heat released in the cooling of the vapor, is transferred to the surface of the film. Therefore, there is always a temperature difference between the vapor and the film of condensate as well as a temperature difference between the film of condensate and the cooling surface.

If, in any cross-section of a heat exchanger, the vapor and liquid would be thoroughly mixed so that they would be in complete equilibrium, then the mixture of liquid and vapor would have a temperature which is referred to as a "mixed mean temperature", hereafter referred to as $t_{mm}$. It is clear that the temperature of the vapor t" is always higher than $t_{mm}$, whereas the temperature of the film t' is always lower than $t_{mm}$. As a result, the driving force for transferring heat through the film of condensate, i.e., temperature difference in between the film and cooling surface, is reduced and the heat transfer coefficient is reduced as well.

It is clear that in the initial stages of condensation, when the condensing stream consists mostly of vapor, the temperature of the film of condensate is substantially lower than $t_{mm}$, whereas the temperature of the vapor t" is close to $t_{mm}$. As a consequence of the temperature difference $\Delta T$ across the film is substantially reduced and the heat transfer coefficient is drastically reduced. On the contrary, in the final stages of condensation, where the greater part of stream is already in the form of a condensate, the temperature of the condensate t' is close to $t_{mm}$ whereas the temperature of the vapor is substantially higher than $t_{mm}$. In this case, the temperature difference $\Delta t$ across the film and the heat transfer coefficient are only insignificantly reduced as compared to the condensation of single component fluids.

Thus, there is a need in the art for an apparatus and method using the apparatus for condensing a multi-component fluid while maximizing the heat transfer coefficient during the entire condensing process.

SUMMARY OF THE INVENTION

The present invention provides a system for condensing multi-component fluids including at least two heat exchange stages and at least one scrubber, where the heat exchange stages and the at least one scrubber are interconnected so that streams are split and mixed in such a ways as to increase the heat transfer coefficient in each of the heat exchange stages.

The present invention also provides a system for condensing multi-component fluids including a plurality of heat exchange stages and at least one scrubber, where the heat exchange stages and the at least one scrubber are interconnected so that streams are split and mixed in such a ways as to increase the heat transfer coefficient in each of the heat exchange stages.

The present invention a plurality of heat exchange stages and a plurality of scrubbers, where the heat exchange stages and the scrubbers are interconnected so that streams are split and mixed in such a ways as to increase the heat transfer coefficient in each of the heat exchange stages.

The present invention provides a process for condensing multi-component fluids including the steps of feeding an input vapor stream comprising a multi-component fluid to a condensation system of this invention where it is split into two sub-streams, one being forwarded to a lower port of a scrubber and the second being combined with a liquid stream from a bottom port of the scrubber. The combined stream is then passes through a first heat exchanger where it is fully condensed forming a first condensed stream which is in turn splitter into two sub-streams, one being forwarded to a top port of the scrubber and the second sub-stream being combined with a scrubber vapor stream taken from an upper port of the scrubber to form a second combined stream. The second combined stream is then passes through a second heat exchanger where it is fully condensed forming a final liquid stream comprising a multi-component stream having a compositions the same or substantially the same as the input stream. The scrubber and its associated streams are designed to increase condensation efficiency by optimizing or maximizing a heat transfer coefficient in each heat exchanger.

The present invention also provides a condensation process including three or more heat exchangers where scrubber vapor streams are combined with condensed streams and optionally liquid streams are sent to or pulled from the scrubber. The scrubber and its associated streams are designed to increase condensation efficiency by optimizing or maximizing a heat transfer coefficient in each heat exchanger.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
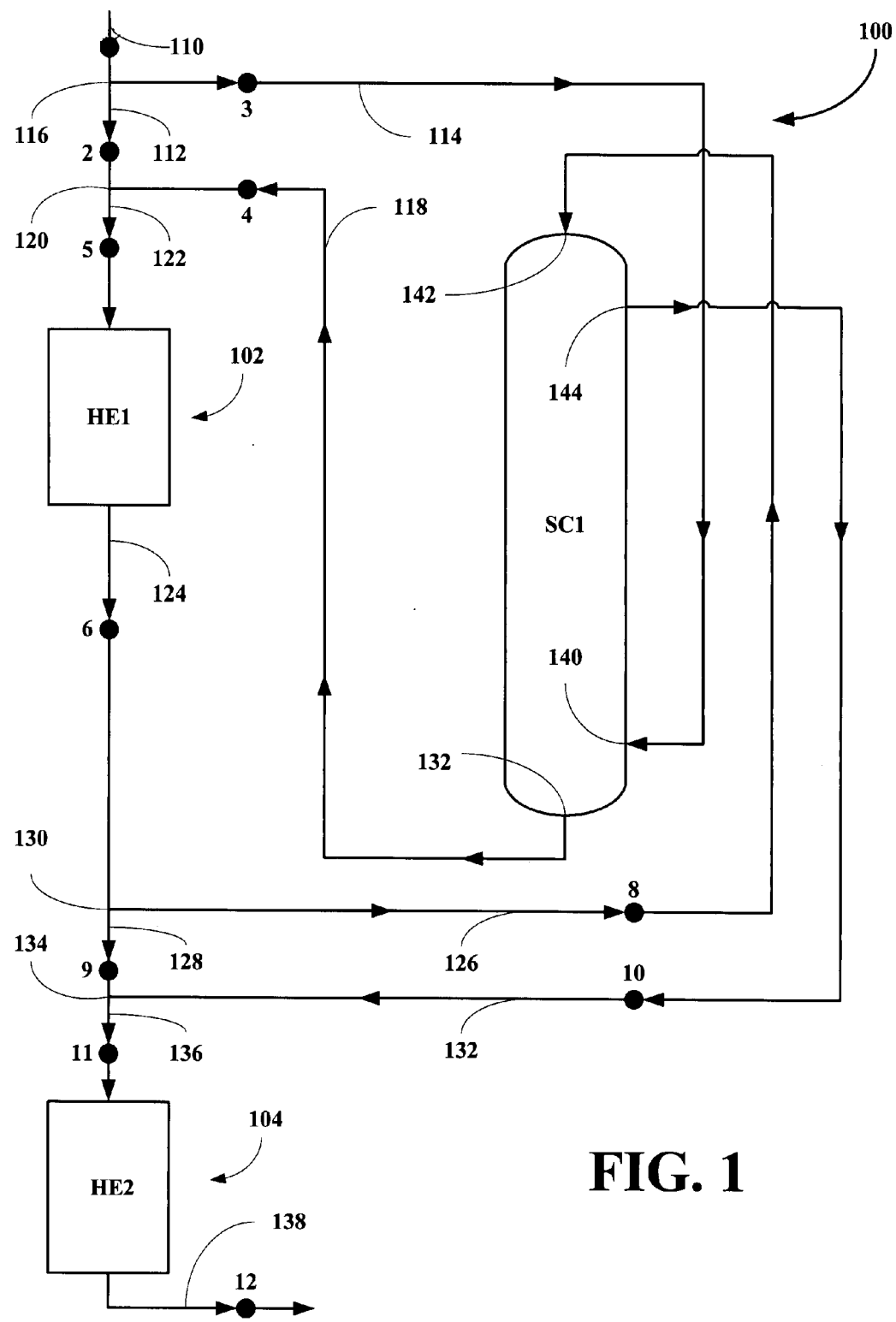
FIG. 1 depicts a schematic diagram of a preferred embodiment of a system of this invention including two heat exchangers and one scrubber.

The inventors have found that a superior apparatus, system and method using the apparatus can be constructed to condense a vaporized multi-component fluid while maintaining a maximized value of a heat transfer coefficient in each heat exchange stage. The apparatus includes at least two heat exchange stages, at least one scrubber, mixer valves and splitter valves for mixing and splitting streams, where vapor, liquid or mixed streams are removed and/or added to each heat exchange stage from the scrubbers or upstream heat exchange stages to provide a fully condensed multi-component fluid having substantially a same composition as the vaporized multi-component input fluid, while maximizing a heat transfer coefficient at each heat exchange stage.

The invention broadly relates to an apparatus/system for condensing multi-component fluids including at least two heat exchange stages and at least one scrubber unit. The apparatus further includes mixers, splitters, ports and lines configured so that a first portion of a multi-component vapor stream enters a multi-component vapor stream input port of the scrubber unit and a second portion of the multi-component vapor stream is mixed with a first liquid stream from a bottom output port of the scrubber unit. The mixed stream is then forwarded to an input of a first heat exchange stage, and a condensed stream exits through an output port of the first heat exchange stage. A portion of the condensed stream is forwarded to a top input port of the scrubber unit, while the remainder of the condensed stream is mixed with a vapor stream from a vapor output port of the scrubber. That mixed stream is then forwarded to an input of a second heat exchange stage where the stream is fully condensed exiting through an output port of the second heat exchange stage to form a fully condensed multi-component fluid having a composition substantially identical to the composition of the vapor multi-component input fluid. When additional heat exchange stages are incorporated into the apparatus, the output stream from each successive heat exchange stage can optionally either be split forwarding a portion of the output stream to secondary liquid input ports of the scrubber unit or mixed with secondary liquid streams from secondary liquid output ports of the scrubber unit. The resulting streams are then mixed with secondary vapor streams from secondary vapor ports of the scrubber unit which are then fed into an input port of the next heat exchange stage. When additional scrubber units are incorporated into the apparatus, the scrubber units are associated with one or more of the heat exchange units.

The system and process of this invention allows a performance of condensation of multi-component fluids to occur in such a way that in every part of the process, the performance has an efficiency substantially identical to an efficiency of a final, most efficient stage of condensation, i.e., has an efficiency substantially identical to an efficient of condensing a single component fluid.

The system and method includes a plurality of heat exchangers and at least one scrubber and splitters and mixers supporting streams that allow a mixed stream to be supplied to each heat exchange unit having parameters designed to increase, optimize or maximize the heat transfer coefficient in each heat exchanger. Condensation efficiency is greatly reduced if significant vapor is in contact with the heat exchange surfaces in the heat exchangers, while condensation efficiency is greatly increased if liquid is in contact with the heat exchange surfaces. The present invention is designed to ensure that each stream going into each heat exchanger has sufficient liquid content to that the heat exchange process is mediated primarily if not exclusively by liquid. The arrangement is especially critical for multi-component fluid because the boiling point to the fluid is continuously changing in the heat exchanger because the composition of the fluid is continuously changing.

In the following detailed description of the preferred embodiments of this invention as illustrated by the Figures, the heat exchange stages are shown a heat exchangers. However, the heat exchange stages can be any conventional or yet to be invented unit that can extract thermal energy from a vapor stream and cooling it to a point below its boiling point. Although no cooling stream is shown in the heat exchangers one of ordinary skill in the art will understand that the stream to be condensed is in thermal contact with a stream of fluid that is capable of lowering the temperature of the stream to be condensed as the stream passes through the heat exchanger. The stream of fluid can be liquid or gas or a mixture thereof and can be external or internal to the power plant in which such a condensation unit is utilized.

DETAILED DESCRIPTION OF THE DRAWINGS

Detailed Description of Single Scrubber Embodiments

Two Heat Exchange Stages—One Scrubber

Referring now to FIG. 1, a preferred embodiment of an apparatus/system for condensing a multi-component fluid, generally 100, is shown to comprise two heat exchange stages 102 and 104, including heat exchangers HE1 and HE2, respectively. The system 100 also includes a scrubber SC1. An input vapor stream 110 comprising a multi-component fluid (the stream to be condensed) and having initial parameters as at a point 21, which can correspond to a state of saturated vapor, enters the system 100. The stream 110 is divided into two sub-streams 112 and 114, having parameters as at points 2 and 3, respectively at a first stream splitter 116. The sub-stream 112 having the parameters as at the point 2 is mixed with a first liquid stream 118 having parameters as at a point 4 at a first stream mixer 120. The state of liquid in the first liquid stream 118 having the parameters as at the point 4 corresponds to a state of saturated liquid, which is in equilibrium with the saturated vapor sub-stream 112 having the parameters as at the point 2. As a result of mixing, a first mixed stream 122 having parameters as at a point 5 is formed. The first mixed stream 122 having the parameters as at the point 5 passes through the heat exchanger HE1 where it is fully condensed and exits the heat exchanger HE1 as a first condensed stream 124 having parameters as at a point 6. The first condensed stream 124 having the parameters as at the point 6 corresponds to a state of saturated liquid and has a substantially leaner composition (i.e., a substantially lower concentration of a low-boiling component of the multi-component fluid) than the input vapor stream 110.

Thereafter, the first condensed stream 124 having the parameters as at the point 6 is divided into two liquid sub-streams 126 and 128, having parameters as at points 8 and 9, respectively at a second splitter 130. Thereafter, the liquid sub-stream 128 having the parameters as at the point 9 is mixed with a scrubber vapor stream 132 having parameters as at a point 10 at a mixer 134, creating a second mixed stream 136 having parameters at as a point 11. The composition of the second mixed stream 136 having the parameters as at the point 11 is substantially the same as the composition of the stream 110 having the parameters as at the point 1. The stream 136 having the parameters as at the point 11 passes through the heat exchanger HE2, where it is fully condensed to form a liquid output stream 138 having parameters as at a point 12 corresponding to a state of saturated liquid.

The vapor sub-stream 114 having the parameters as at the point 3 (as described above) is forwarded to a lower port 140 of the scrubber SC1, while the liquid stream 126 having the parameters as at the point 8 is sent into a top port 142 of the scrubber SC1. A counter flow process of mass and heat exchange occurs in the scrubber SC1, where liquid flows down the scrubber SC1 as vapor raises up. As a result, at the top of the scrubber SC1, vapor is in equilibrium with liquid having the parameters as at the point 10, which was sent to the top port 142 of the scrubber SC1 (as described above). This vapor is removed from an upper port 144 of the scrubber SC1, forming the vapor stream 132 having the parameters as at the point 10, which is mixed with the stream 128 having the parameters as at the point 9 (as described above). Liquid collected at the bottom of the scrubber SC1 is in equilibrium with vapor of the sub-stream 114 having the parameters as at the point 3 (as described above). That liquid is removed from a bottom port 146 of the scrubber SC1 forming the stream 118 having the parameters as at the point 4, which is mixed with the vapor stream 112 having the parameters as at the point 2 forming the mixed stream 122 having the parameters as at the point 5 (as described above).

The system is closed save for the input stream 110 and the output stream 138. Of course, when this condensing apparatus comprises a part of a complete energy extraction unit, the entire system is closed, i.e., a multi-component fluid is sent through of vaporizing unit, then to an energy extraction unit and then to a fluid condensation unit of this invention and then back to the vaporizing unit forming a closed loop.

Three Heat Exchange Stages—One Scrubber—First Embodiment

Figure 2:
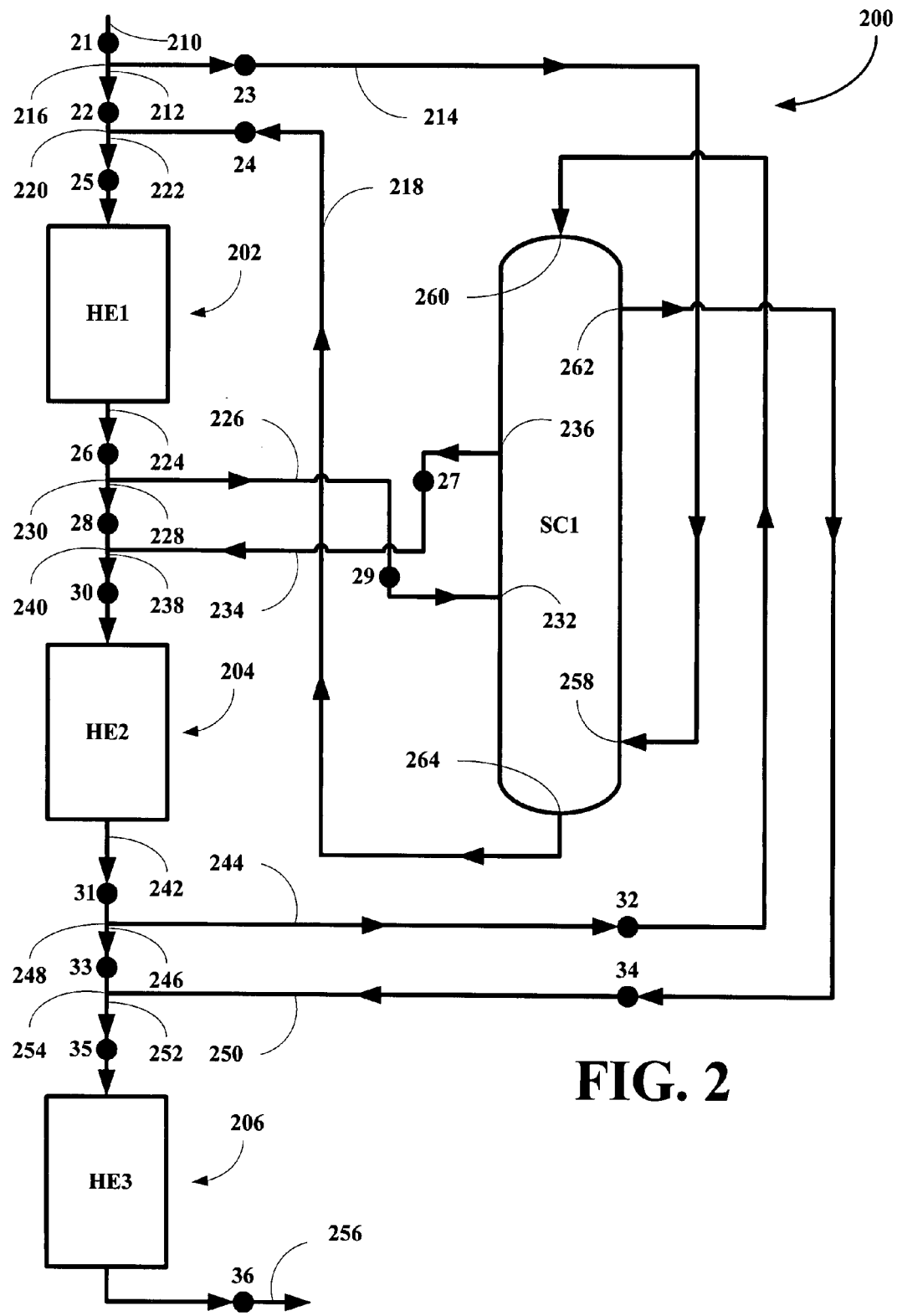
FIG. 2 depicts a schematic diagram of another preferred embodiment of a system of this invention including three heat exchangers and one scrubber.

Referring now to FIG. 2, a preferred embodiment of a system for condensing a multi-component fluid, generally 200, is shown to comprise three heat exchange stages 202, 204, and 206, each stage including a heat exchanger HE1, HE2, and HE3, respectively. The system also includes a scrubber SC1. An input vapor stream 210 comprising a multi-component fluid (the stream to be condensed) and having initial parameters as at a point 21, which can correspond to a state of saturated vapor, enters the system 200. The stream 210 is divided into vapor two sub-streams 212 and 214, having parameters as at points 22 and 23, respectively, at a splitter 216. The first vapor sub-stream 212 having the parameters as at the point 22 is mixed with a first liquid stream 218 having parameters as at a point 24 at a mixer 220. The state of liquid in the first liquid stream 218 having the parameters as at the point 24 corresponds to a state of saturated liquid, which is in equilibrium with the saturated vapor sub-stream 212 having parameters as at the point 22. As a result of mixing, a first mixed stream 222 having parameters as at a point 25 is formed. The mixed stream 222 having the parameters as at the point 25 passes through the heat exchanger HE1 where it is fully condensed and exits the heat exchanger HE1 as a first condensed stream 224 having parameters as at a point 26. The condensed stream 224 having the parameters as at the point 26 corresponding to a state of saturated liquid has a substantially leaner composition (i.e., a substantially lower concentration of a low-boiling component of the multi-component fluid) than the input vapor stream 210.

Thereafter, the first condensed stream 224 having the parameters at the point 26 is optionally divided into two liquid sub-streams 226 and 228, having parameters as at points 28 and 29, respectively, at a splitter 230. The second liquid sub-stream 228 having the parameters at the point 29 is forwarded to a liquid port 232 of the scrubber SC1. The first liquid sub-stream 226 is mixed with a second vapor stream 234 having parameters as at a point 27 from a vapor port 236 of the scrubber SC1 to form a second mixed stream 238 having parameters as at a point 30 at a second mixer 240. The second vapor stream 234 having the parameters as at the point 27 is in equilibrium or is in substantial equilibrium with the liquid sub-stream 226 having the parameters as at the point 28.

The second mixed stream 238 having the parameters as at the point 30 passes through the heat exchanger HE2 where the mixed stream 238 is fully condensed to form a second condensed stream 242 having parameters as at a point 31, corresponding to a state of saturated liquid. The saturated liquid of the second condensed stream 242 having the parameters as at the point 31 is always leaner (see above) than the input stream 210 having the parameters as at the point 21.

Thereafter, the second condensed stream 242 having the parameters as at the point 31 is divided into two liquid sub-streams 244 and 246, having parameters as at points 32 and 33, respectively, at a second splitter 248. Thereafter, the fourth liquid sub-stream 246 having the parameters as at the point 33 is mixed with a fourth vapor stream 250 having parameters as at a point 34, creating a third mixed stream 252 having parameters at as a point 35 at a third mixer 254. The composition of the third mixed stream 252 having the parameters as at the point 35 is the same or substantially the same as the composition of the input stream 210 that entered the system having the parameters as at the point 21. The third mixed stream 252 having parameters as at the point 35 passes through the heat exchanger HE3, were it is fully condensed to form an output condensed stream 256 having parameters as at a point 36 corresponding to a state of saturated liquid.

The vapor sub-stream 214 having parameters as at point 23 (as described above) is forwarded to a lower port 258 of the scrubber SC1, while the liquid stream 246 having the parameters as at the point 28 is sent into a top port 260 of the scrubber SC1. A counter flow process of mass and heat exchange occurs in the scrubber SC1, where liquid flows down the scrubber SC1 as vapor raises up. As a result, at the top of SC1, vapor is in equilibrium with liquid entering the top port 260 of the scrubber SC1. The resulting vapor exits the scrubber SC1 through an upper port 262 to form the vapor stream 250 having the parameters as at the point 34, which is mixed with the third liquid sub-stream 244 having the parameters as at the point 33 (as described above). Liquid collected at the bottom of SC1 is in equilibrium with vapor having the parameters as at the point 23 (as described above) which has been sent to the bottom of the scrubber SC1. This liquid is removed from the scrubber SC1 via a bottom port 264 forming the first liquid stream 218 having the parameters as at the point 24, which is mixed with the vapor sub-stream 212 having the parameters as at the point 22 forming the first mixed stream 222 having the parameters as at the point 25 (as described above).

The vapor port 236 is located at an appropriate point in a middle region of the scrubber SC1, where the vapor stream 234 having the parameters as at the point 27 is removed, while the liquid port 232 is located at another appropriate point in a middle region of the scrubber SC1, where the liquid stream 228 having the parameters as at the point 29 is added. The interaction between these two streams 228 and 234 having the parameters 29 and 27, respectively, and the steam 224 having the parameters as at the point 26 is as described above.

The system is closed save for the input stream 210 and the output stream 256. Of course, when this condensing apparatus comprises a part of a complete energy extraction unit, the entire system is closed, i.e., a multi-component fluid is sent through of vaporizing unit, then to an energy extraction unit and then to a fluid condensation unit of this invention and then back to the vaporizing unit forming a closed loop.

Three Heat Exchange Stages—One Scrubber—Second Embodiment

Figure 3:
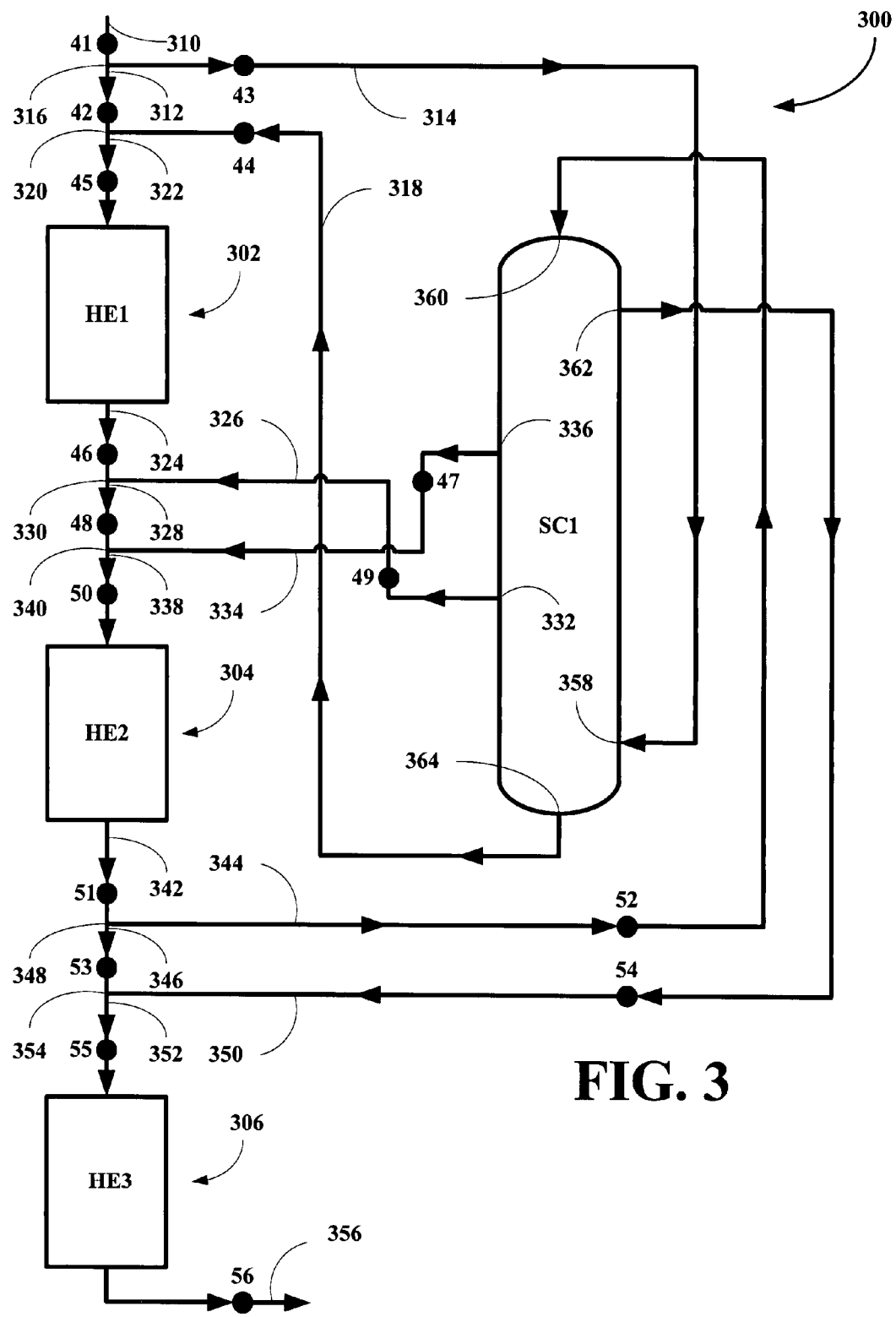
FIG. 3 depicts a schematic diagram of another preferred embodiment of a system of this invention including three heat exchangers and one scrubber.

Referring now to FIG. 3, a preferred embodiment of a system for condensing a multi-component fluid, generally 300, is shown to comprise three heat exchange stages 302, 304, and 306, each stage including a heat exchanger HE1, HE2, and HE3, respectively. The system also includes a scrubber SC1. An input vapor stream 310 comprising a multi-component fluid (the stream to be condensed) and having initial parameters as at a point 41, which can correspond to a state of saturated vapor, enters the system 300. The stream 310 is divided into vapor two sub-streams 312 and 314, having parameters as at points 42 and 43, respectively, at a splitter 316. The first vapor sub-stream 312 having the parameters as at the point 42 is mixed with a first liquid stream 318 having parameters as at a point 44 at a mixer 320. The state of liquid in the first liquid stream 318 having the parameters as at the point 44 corresponds to a state of saturated liquid, which is in equilibrium with the saturated vapor sub-stream 312 having parameters as at the point 42. As a result of mixing, a first mixed stream 322 having parameters as at a point 45 is formed. The mixed stream 322 having the parameters as at the point 45 passes through the heat exchanger HE1 where it is fully condensed and exits the heat exchanger HE1 as a first condensed stream 324 having parameters as at a point 46. The condensed stream 324 having the parameters as at the point 46 corresponding to a state of saturated liquid has a substantially leaner composition (i.e., a substantially lower concentration of a low-boiling component of the multi-component fluid) than the input vapor stream 310.

Thereafter, the first condensed stream 324 having the parameters at the point 46 is optionally mixed with a liquid stream 326 having parameters as at a point 49 at a second mixer 330 to form a liquid stream 328, where the liquid stream 328 is withdrawn from the scrubber SC1 at a liquid port 332. The liquid stream 326 is then mixed with a second vapor stream 334 having parameters as at a point 47 from a vapor port 336 of the scrubber SC1 to form a second mixed stream 338 having parameters as at a point 50 at a second mixer 340. The second vapor stream 334 having the parameters as at the point 47 is in equilibrium or is in substantial equilibrium with the liquid sub-stream 328 having the parameters as at the point 48.

The second mixed stream 338 having the parameters as at the point 50 passes through the heat exchanger HE2 where the mixed stream 338 is fully condensed to form a second condensed stream 342 having parameters as at a point 51, corresponding to a state of saturated liquid. The saturated liquid of the second condensed stream 342 having the parameters as at the point 51 is always leaner (see above) than the input stream 310 having the parameters as at the point 41.

Thereafter, the second condensed stream 342 having the parameters as at the point 51 is divided into two liquid sub-streams 344 and 346, having parameters as at points 52 and 53, respectively, at a second splitter 348. Thereafter, the third liquid sub-stream 344 having the parameters as at the point 53 is mixed with a fourth vapor stream 350 having parameters as at a point 54, creating a third mixed stream 352 having parameters at as a point 55 at a third mixer 354. The composition of the third mixed stream 352 having the parameters as at the point 55 is the same or substantially the same as the composition of the input stream 310 that entered the system having the parameters as at the point 41. The third mixed stream 352 having parameters as at the point 55 passes through the heat exchanger HE3, were it is fully condensed to form an output condensed stream 356 having parameters as at a point 36 corresponding to a state of saturated liquid.

The vapor sub-stream 314 having parameters as at point 43 (as described above) is forwarded to a lower port 358 of the scrubber SC1, while the liquid stream 346 having the parameters as at the point 48 is sent into a top port 360 of the scrubber SC1. A counter flow process of mass and heat exchange occurs in the scrubber SC1, where liquid flows down the scrubber SC1 as vapor raises up. As a result, at the top of SC1, vapor is in equilibrium with liquid entering the top port 360 of the scrubber SC1. The resulting vapor exits the scrubber SC1 through an upper port 362 to form the vapor stream 350 having the parameters as at the point 54, which is mixed with the third liquid sub-stream 344 having the parameters as at the point 53 (as described above). Liquid collected at the bottom of SC1 is in equilibrium with vapor having the parameters as at the point 43 (as described above) which has been sent to the bottom of the scrubber SC. This liquid is removed from the scrubber SC1 via a bottom port 364 forming the first liquid stream 318 having the parameters as at the point 24, which is mixed with the vapor sub-stream 312 having the parameters as at the point 42 forming the first mixed stream 322 having the parameters as at the point 45 (as described above).

The vapor port 336 is located at an appropriate point in a middle region of the scrubber SC1, where the vapor stream 334 having the parameters as at the point 47 is removed, while the liquid port 332 is located at another appropriate point in a middle region of the scrubber SC1, where the liquid stream 328 having the parameters as at the point 49 is added. The interaction between these two streams 328 and 334 having the parameters 49 and 47, respectively, and the steam 324 having the parameters as at the point 46 is as described above.

The system is closed save for the input stream 310 and the output stream 356. Of course, when this condensing apparatus comprises a part of a complete energy extraction unit, the entire system is closed, i.e., a multi-component fluid is sent through of vaporizing unit, then to an energy extraction unit and then to a fluid condensation unit of this invention and then back to the vaporizing unit forming a closed loop.

Four Heat Exchange Stages—One Scrubber

Figure 4:
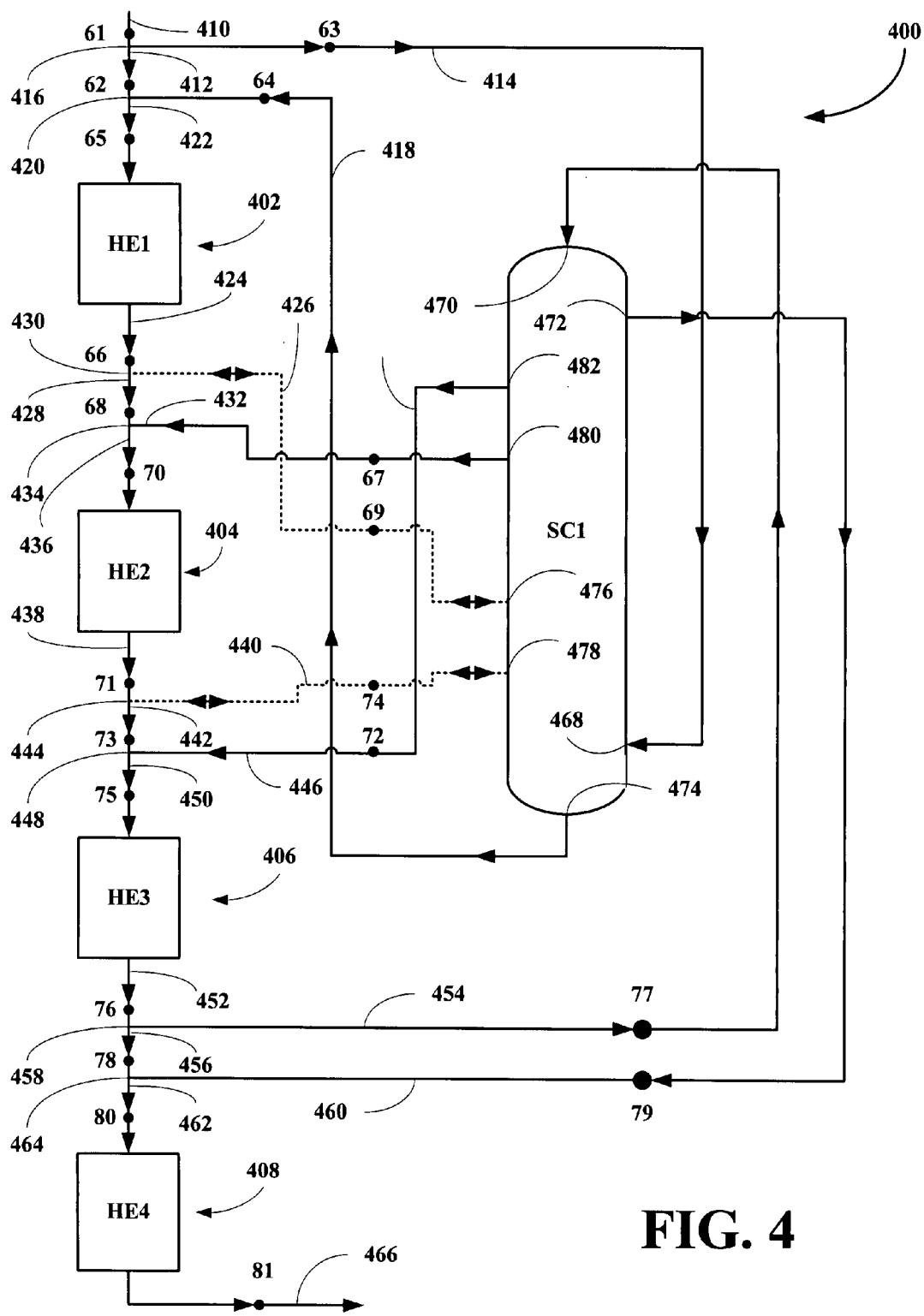
FIG. 4 depicts a schematic diagram of another preferred embodiment of a system of this invention including four heat exchangers and one scrubbers.

Referring now to FIG. 4, a preferred embodiment of a system for condensing a multi-component fluid, generally 400, is shown to comprise four heat exchange stages 402, 404, 406 and 408, each stage including a heat exchanger HE1, HE2, HE3 and HE4, respectively. The system also includes a scrubber SC1. A vapor multi-component stream 410, the stream to be condensed, and having initial parameters as at a point 61, which can correspond to a state of saturated vapor, enters the system 400. The initial vapor stream 410 is divided into two sub streams 412 and 414, having parameters as at points 62 and 63, respectively at a splitter 416. The vapor sub-stream 412 having the parameters as at the point 62 is mixed with a first liquid stream 418 having parameters as at a point 64 at a mixer 420. The state of liquid in the liquid stream 418 having parameters as at the point 64 corresponds to a state of saturated liquid, which is in equilibrium with the saturated vapor sub-stream 412 having parameters as at the point 62. As a result of mixing, a first mixed stream 422 having parameters as at a point 65 is formed. The mixed stream 420 having the parameters as at the point 65 passes through the heat exchanger HE1 where it is fully condensed and exits the heat exchanger HE1 as a first condensed stream 424 having parameters as at a point 66. The condensed stream 424 having the parameters as at the point 66 corresponding to a state of saturated liquid having a substantially leaner composition (i.e., a substantially lower concentration of a low-boiling component of the multi-component fluid) than the initial stream 410.

Thereafter, optionally a scrubber liquid stream 426 having parameters as at a point 69 is added to the condensed stream 424 having the parameters at the point 66, forming a first combined liquid stream 428 having parameters as at a point 68 at mixer 430. The parameters of the stream 426 are substantially the same, if not identical to the parameters of the stream 424. Alternatively, the first condensed stream 410 having the parameter as a the point 66 is split into liquid sub-streams 426 and 428 as at splitter 430, where the sub-stream 426 is sent to the scrubber SC1. The two optional alternatives are indicated by dashed lines with bi-directional arrows for stream 426 as shown in FIG. 4. As the liquid stream 426 is optional, it is of course an alternative that no liquid is added or removed from the condensed stream 424 having the parameters as at the point 66. However, in all cases, we designate the stream 428 to have the parameter as at the point 68.

Thereafter, a scrubber vapor stream 432 having parameters as at point 67 is added to the stream 428 having parameters as the point 68 at a mixer 434, forming a mixed stream 436 having parameters as at a point 70. The vapor stream 432 having parameters as at point 67 is in equilibrium or is substantially in equilibrium with the liquid stream 428 having the parameters as at the point 68.

The stream 436 having the parameters as at the point 70 then passes through heat exchanger HE2 where it is fully condensed to form a second condensed stream 438 having parameters as at a point 71, corresponding to a state of saturated liquid. The saturated liquid of the condensed stream 438 is always leaner (see above) than the initial stream 410 having the parameters as at the point 61.

Similarly and optionally, a scrubber liquid stream 440 having parameters as at a point 74 is added to the condensed stream 438 having the parameters at the point 71, forming a second combined liquid stream 442 having parameters as at a point 73 at mixer 444. The parameters of the stream 440 are substantially the same, if not identical to the parameters of the stream 438. Alternatively, the second condensed stream 438 having the parameter as a the point 71 is split into liquid sub-streams 440 and 442 as at a splitter 444, where the sub-stream 440 is sent to the scrubber SC1. The two optional alternatives are indicated by dashed lines with bi-directional arrows for stream 440 as shown in FIG. 4. As the liquid stream 440 is optional, it is of course an alternative that no liquid is added or removed from the condensed stream 438 having the parameters as at the point 71. However, in all cases, we designate the stream 442 to have the parameter as at the point 73.

Thereafter, a second scrubber vapor stream 446 having parameters as at point 72 is added to the stream 442 having parameters as the point 73 at a mixer 448, forming a second mixed stream 450 having parameters as at a point 75. The vapor stream 446 having parameters as at point 72 is in equilibrium or is substantially in equilibrium with the liquid stream 442 having the parameters as at the point 73.

The mixed stream 450 having the parameters as at the point 75 then passes through heat exchanger HE3 where it is fully condensed to form a third condensed stream 452 having parameters as at a point 76, corresponding to a state of saturated liquid. The saturated liquid of the condensed stream 452 is always leaner (see above) than the initial stream 410 having the parameters as at the point 61.

Thereafter, the third condensed stream 452 having the parameters as at the point 76 is divided into two liquid sub-streams 454 and 456, having parameters as at points 77 and 78, respectively, at a fourth splitter 458. Thereafter, the liquid sub-stream 456 having the parameters as at the point 78 is mixed with a third scrubber vapor stream 460 having parameters as at a point 79, creating a fourth mixed stream 462 having parameters at as a point 80 at a third mixer 464. The composition of the fourth mixed stream 462 having the parameters as at the point 80 is the same or substantially the same as the composition of the input stream 410 that entered the system having the parameters as at the point 61. The fourth mixed stream 462 having parameters as at the point 80 passes through the fourth heat exchanger HE4, were it is fully condensed to form an output condensed stream 466 having parameters as at a point 81 corresponding to a state of saturated liquid.

The stream 414 of vapor of having parameters as at point 63 (as described above) is sent into a bottom port 468 of the scrubber SC1, while the liquid sub-stream 454 having parameters as at the point 77 is sent into a top port 470 of the scrubber SC1. A counter flow process of mass and heat exchange occurs in the scrubber SC1, where liquid flows down the scrubber SC1 as vapor raises up. As a result, at the top of the scrubber SC1, vapor of the vapor stream 460 is in equilibrium with liquid of the liquid stream 454 having the parameters as at the point 77, which was sent to the top port 470 of the scrubber SC1 (see above). This vapor stream 460 having the parameters as at the point 79 is withdrawn from the scrubber at an upper port 472 and then mixed with the liquid stream 456 having the parameters as at the point 78 (as described above). Liquid collected at the bottom of SC1 is in equilibrium with vapor in the vapor stream 414 having the parameters as at the point 63 (as described above) which entered the scrubber SC1 at the bottom port 468. This liquid is removed from the scrubber SC1 at a bottom port 474 forming the liquid stream 418 having the parameters as at the point 64, which was mixed with the vapor sub-stream 412 having the parameters as at the point 26 forming the mixed stream 422 having the parameters as at the point 63 (as described above).

From appropriate ports 476 and 478, respectively, in a middle section of the scrubber SC1, optional liquid streams 426 and 440 are removed or added depending on the specific embodiment. From other appropriated ports 478 and 480, respectively, in a middle section of the scrubber SC1, the vapor streams 432 and 446 are removed. The liquid stream 426 and the vapor stream 432 are used to modify the stream 436 going into the second heat exchanger HE2 or the second heat exchanger HE2 and the scrubber SC1. Similarly, the liquid stream 440 and the vapor stream 446 are used to modify the stream 450 going into the third heat exchanger HE3 or the third heat exchanger HE3 and the scrubber SC1. One experienced in the art can always find a proper position of withdrawal and/or addition of streams 426, 432, 440, and 442.

The system is closed save for the input stream 410 and the output stream 466. Of course, when this condensing apparatus comprises a part of a complete energy extraction unit, the entire system is closed, i.e., a multi-component fluid is sent through of vaporizing unit, then to an energy extraction unit and then to a fluid condensation unit of this invention and then back to the vaporizing unit forming a closed loop.

Detailed Description of Two Scrubber Embodiment

Three Heat Exchange Stages—Two Scrubber

Figure 5:
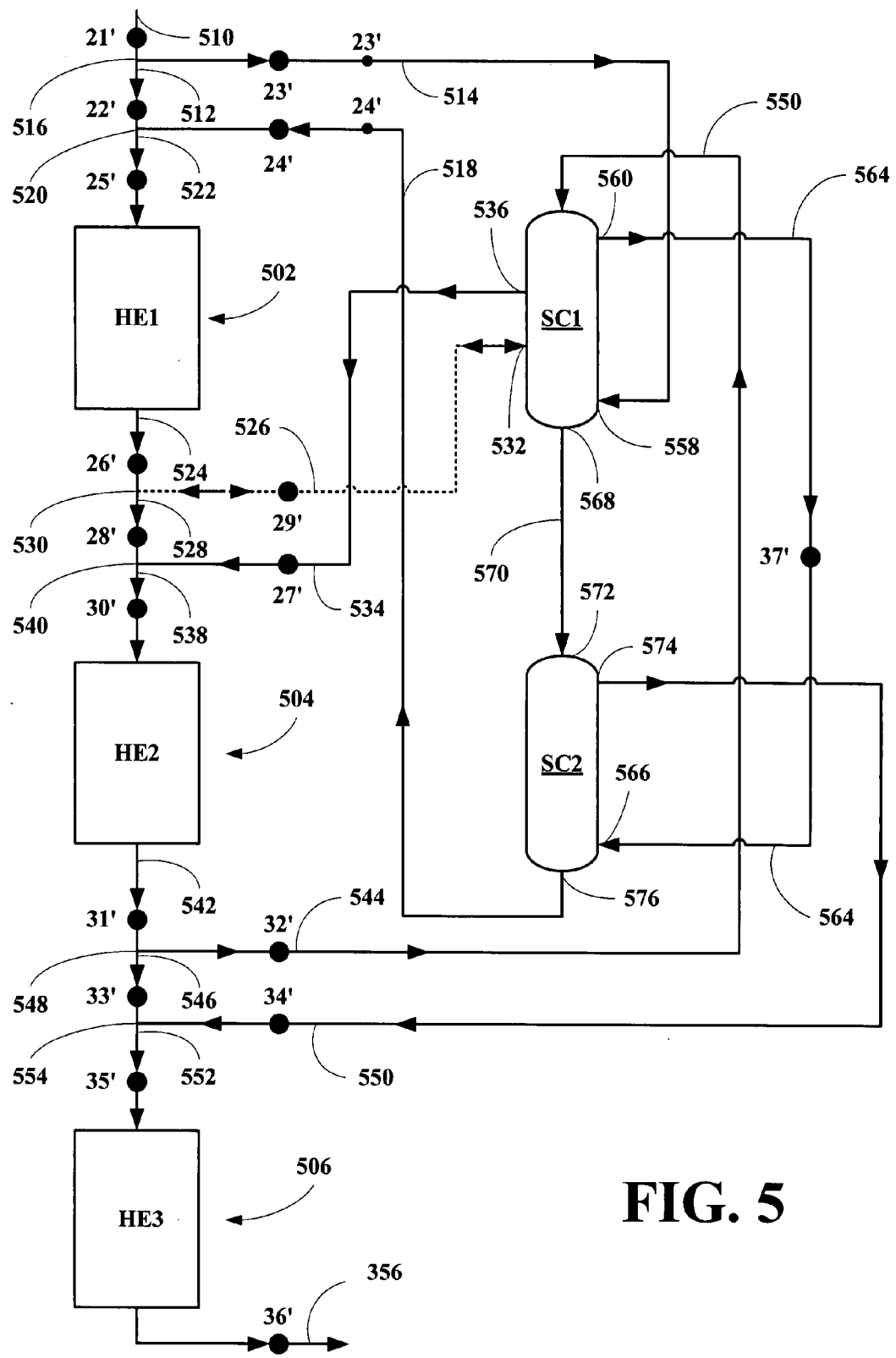
FIG. 5 depicts a schematic diagram of another preferred embodiment of a system of this invention including three heat exchangers and two scrubbers.

Referring now to FIG. 5, a preferred embodiment of the condensation system of this, generally 500 is shown to comprise four heat exchange stages 502, 504, and 508, each stage including a heat exchanger HE1, HE2 and HE3, respectively. The system also includes two scrubbers SC1, and SC2, one for each of the intermediate heat exchangers HE1 and HE2. Because this embodiment represents a variation of the system of FIG. 2, the stream are numbered accordingly with primes to distinguish the streams over the stream of FIG. 2.

An input vapor stream 510 comprising a multi-component fluid (the stream to be condensed) and having initial parameters as at a point 21', which can correspond to a state of saturated vapor, enters the system 500. The stream 510 is divided into vapor two sub-streams 512 and 514, having parameters as at points 22' and 23', respectively, at a splitter 516. The first vapor sub-stream 512 having the parameters as at the point 22' is mixed with a first liquid stream 518 having parameters as at a point 24' at a mixer 520. The state of liquid in the first liquid stream 518 having the parameters as at the point 24' corresponds to a state of saturated liquid, which is in equilibrium with the saturated vapor sub-stream 512 having parameters as at the point 22'. As a result of mixing, a first mixed stream 522 having parameters as at a point 25' is formed. The mixed stream 522 having the parameters as at the point 25' passes through the heat exchanger HE1 where it is fully condensed and exits the heat exchanger HE1 as a first condensed stream 524 having parameters as at a point 26'. The condensed stream 524 having the parameters as at the point 26' corresponding to a state of saturated liquid has a substantially leaner composition (i.e., a substantially lower concentration of a low-boiling component of the multi-component fluid) than the input vapor stream 510.

Thereafter, optionally a scrubber liquid stream 526 having parameters as at a point 29' is added to the condensed stream 524 having the parameters at the point 26', forming a first combined liquid stream 528 having parameters as at a point 28' at mixer 530. The scrubber liquid stream 526 exits the scrubber SC1 via liquid port 532. The parameters of the stream 528 are substantially the same, if not identical to, the parameters of the stream 524. Alternatively, the first condensed stream 524 having the parameter as a the point 26' is split into liquid sub-streams 526 and 528 as at splitter 530, where the sub-stream 526 is sent to the scrubber SC1 at the port 532. The two optional alternatives are indicated by dashed lines with bi-directional arrows for stream 526 as shown in FIG. 5. As the liquid stream 526 is optional, it is of course an alternative that no liquid is added or removed from the condensed stream 524 having the parameters as at the point 26'. However, in all cases, we designate the stream 528 to have the parameter as at the point 28'.

The stream 528 is then mixed with a second vapor stream 534 having parameters as at a point 27' from a vapor port 536 of the scrubber SC1 to form a second mixed stream 538 having parameters as at a point 30' at a second mixer 540. The second vapor stream 534 having the parameters as at the point 27' is in equilibrium or is in substantial equilibrium with the liquid sub-stream 526 having the parameters as at the point 28'.

The second mixed stream 538 having the parameters as at the point 30 passes through the heat exchanger HE2 where the mixed stream 538 is fully condensed to form a second condensed stream 542 having parameters as at a point 31', corresponding to a state of saturated liquid. The saturated liquid of the second condensed stream 542 having the parameters as at the point 31' is always leaner (see above) than the input stream 510 having the parameters as at the point 21'.

Thereafter, the second condensed stream 542 having the parameters as at the point 31' is divided into two liquid sub-streams 544 and 546, having parameters as at points 32' and 33', respectively, at a second splitter 548. Thereafter, the fourth liquid sub-stream 446 having the parameters as at the point 33' is mixed with a fourth vapor stream 550 having parameters as at a point 34', creating a third mixed stream 552 having parameters at as a point 35' at a third mixer 554. The composition of the third mixed stream 552 having the parameters as at the point 35' is the same or substantially the same as the composition of the input stream 510 that entered the system having the parameters as at the point 21'. The third mixed stream 552 having parameters as at the point 35' passes through the heat exchanger HE3, were it is fully condensed to form an output condensed stream 556 having parameters as at a point 36' corresponding to a state of saturated liquid.

The vapor sub-stream 514 having parameters as at point 23' (as described above) is forwarded to a lower port 558 of the scrubber SC1, while the liquid stream 544 having the parameters as at the point 32' is sent into a top port 560 of the scrubber SC1. A counter flow process of mass and heat exchange occurs in the scrubber SC1, where liquid flows down the scrubber SC1 as vapor raises up. As a result, at the top of SC1, vapor is in equilibrium with liquid entering the top port 560 of the scrubber SC1. The resulting vapor exits the scrubber SC1 through an upper port 562 to form an inter-scrubber vapor stream 564 having parameters as at a point 37', which is forwarded to a lower port 566 of the second scrubber SC2. Liquid collected at the bottom of SC1 is in equilibrium with vapor having the parameters as at the point 23' (as described above) which has been sent to the bottom of the scrubber SC1. This liquid is removed from the scrubber SC1 through a bottom port 568 forming the inter-scrubber liquid stream 570 having the parameters as at the point 38', which is forwarded to a top port 572 of the second scrubber SC2. A counter flow process of mass and heat exchange occurs in the second scrubber SC2 as is true from the scrubber SC1, where liquid from the inter-scrubber stream 570 flows down the second scrubber SC2 as vapor raises up from inter-scrubber vapor stream 564. As a result, at the top of the second scrubber SC2, vapor is in equilibrium with liquid entering the top port 572 of the second scrubber SC2. The resulting vapor exits the second scrubber SC2 through an upper port 574 to form the vapor stream 550 having the parameters of the point 34'. Liquid collected at the bottom of the second scrubber SC2 is in equilibrium with vapor having the parameters as at the point 37' (as described above) which has been sent to the bottom of the second scrubber SC2. This liquid is removed from the second scrubber SC2 through a bottom port 576 forming the liquid stream 518 having the parameters as at the point 24'.

The vapor port 536 is located at an appropriate point in a middle region of the scrubber SC1, where the vapor stream 534 having the parameters as at the point 27' is removed, while the liquid port 532 is located at another appropriate point in a middle region of the scrubber SC1, where the liquid stream 526 having the parameters as at the point 29' is added or removed. The interaction between these two streams 526 and 534 having the parameters 29' and 27', respectively, and the steam 524 having the parameters as at the point 26' is as described above.

The system is closed save for the input stream 510 and the output stream 556. Of course, when this condensing apparatus comprises a part of a complete energy extraction unit, the entire system is closed, i.e., a multi-component fluid is sent through of vaporizing unit, then to an energy extraction unit and then to a fluid condensation unit of this invention and then back to the vaporizing unit forming a closed loop.

As shown in FIGS. 1-4, the total process of condensation is divided into heat exchange stages, with a minimum of two heat exchange stages being the lower limit and the upper limit being as many heat exchange stages as desired, in which case intermediate addition and/or withdrawal streams from the scrubber SC1 (analogous to steams 226 and 234) are added to the middle heat exchange stages, excluding the first and last heat exchange stages. As an alternative, it is also possible to have a separate scrubber for each heat exchange section as shown in FIG. 5. In such a case, liquid from the bottom of each scrubber must be sent to the top of the next scrubber (with lower average temperature). One experienced in the art will be able to design, upon this basis, an appropriate system for any specific need.

As can be seen from the presented description, in every heat exchange section of the heat exchanger, the process of condensation is a process of complete (i.e., final) condensation, and therefore the heat transfer coefficient in these heat exchanger section is the highest possible for the condensation of multi-component fluids. This allows a significant reduction of the required surface, size and cost of these heat exchangers (or heat exchanger sections). The additional cost associated with the installation of a scrubber and the required piping is much less than the savings achieved by the increased heat transfer coefficient achievable in the heat exchange sections.

Figure 6:
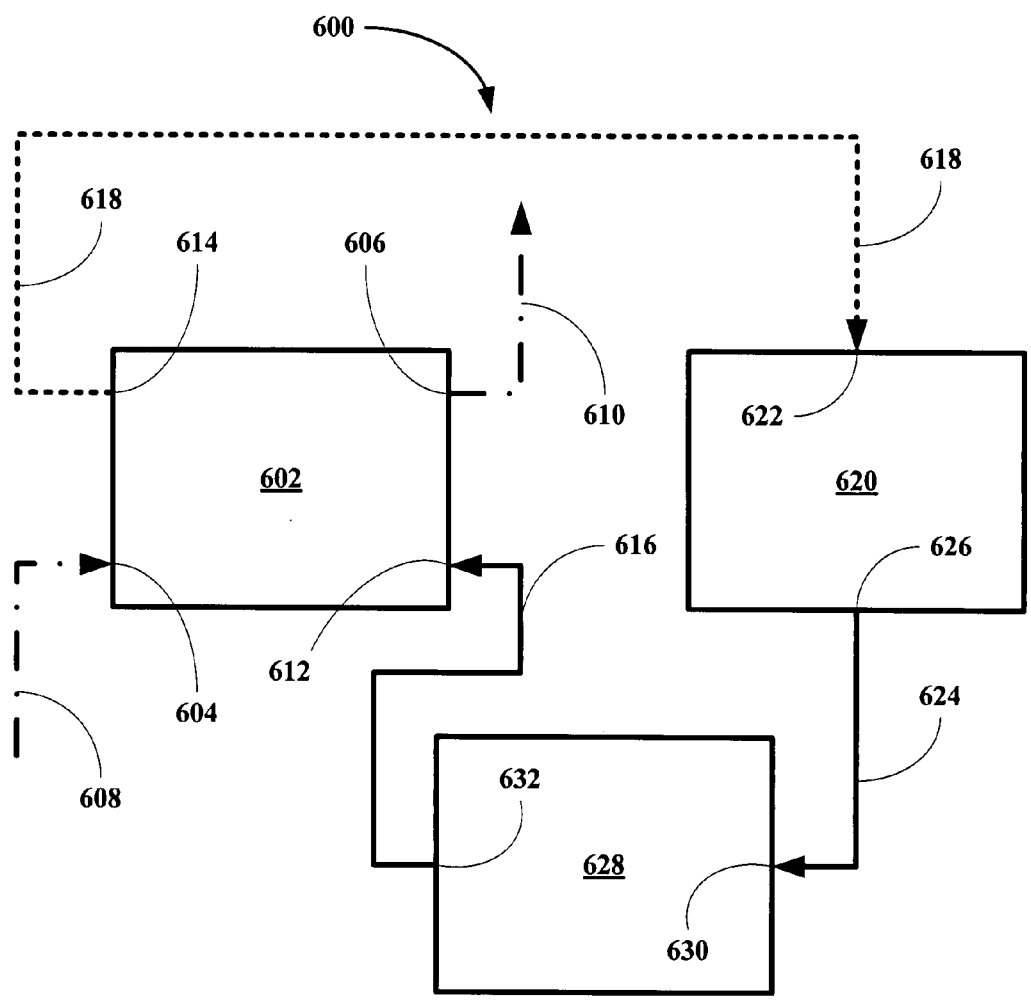
FIG. 6 depicts a schematic diagram of a preferred embodiment of a heat extraction system of this including a condensing stage of this invention, a vaporization stage and an energy extraction stage.

Energy Extraction Apparatus Including a Condensation Apparatus of this Invention Referring now to FIG. 6, a preferred embodiment of the condensation system of this, generally 600, is shown is shown is shown to include a multi-component working fluid vaporization unit 602. The unit 602 includes an heat source input 604 and a heat source output 606, where the input 604 inputs a heat source 608 shown here as an input heat source stream, but can be any other heat source and where the output 606 outputs a spent heat source 610 shown here as a spent heat source stream. Of course, if the heat source was focused sun light or other forms of electromagnetic radiation, then the input 604 would input light and the output 606 would output unused light.

The unit 602 also includes a liquid multi-component working fluid input 612 and a vapor multi-component working fluid output 614, where the liquid input 612 inputs an input liquid multi-component working fluid stream 616 and where the vapor output 614 outputs a final vapor multi-component working fluid stream 618. The vapor stream 618 is forwarded to an energy conversion unit 620 through a conversion unit vapor input 622. The energy conversion unit 620 extracts thermal energy from the final vapor stream 618 to produce a spent stream 624 and useable energy such as electrical energy or the like. Such energy conversion units can include any energy conversion unit known in the art including those described in U.S. Pat. Nos.: 4,346,561; 4,489,563; 4,548,043; 4,586,340; 4,604,867; 4,674,285; 4,732,005;4,763,480; 4,899,545; 4,982,568; 5,029,444; 5,095,708; 5,440,882; 5,450,821; 5,572,871; 5,588,298; 5,603,218; 5,649,426; 5,754,613; 5,822,990; 5,950,433; 5,953,918; and 6,347,520; in co-pending U.S. patent application Ser. Nos.: Ser. No. 10/242,301 filed 12 Sep. 2002; Ser. No. 10/252,744 filed 23 Sep. 2002; Ser. No. 10/320,345 filed 16 Dec. 2002, and Ser. No. 10/357,328 filed 3 Feb. 2003, incorporated herein by reference.

The spent stream 624 exits the conversion unit 620 through a conversion output 626 and enters a multi-component working fluid condensation unit 628 of this invention through a condensation unit output 630. The condensation unit 628 fully condenses the spent stream 624 as set forth above forming the liquid stream 616 exiting from a condensation unit output 632, which then enters the vaporization unit 602 through the input 612 forming a closed loop system.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modifications that may be made which do not depart from the scope of the invention as described above and claimed hereafter.

I claim:

1. An apparatus for condensing multi-component fluids comprising:

a plurality of heat exchange stages, at least one scrubber adapted to receive at least one input liquid stream and at least one input vapor stream and produce at least one output liquid stream and at least one output vapor stream, and a plurality of mixers and splitters, where the at least one scrubber and the mixers and the splitter are configured to form a partially condensed stream derived from a vapor multi-component feed stream for each of the heat exchange stages, where each partially condensed stream has parameters adapted to increase a heat transfer coefficient in each of the heat exchange stages, where each of the heat exchange stages is adapted to fully condense its partially condensed stream, and where a last heat exchange stage is adapted to produce a fully condensed multi-component output stream.

2. The apparatus of claim 1, where the plurality of heat exchange stages is two.

3. The apparatus of claim 1, where the plurality of beat exchange stages is three.

4. The apparatus of claim 1, where the plurality of heat exchange stages is four.

5. The apparatus of claim 1, where the plurality of heat exchange stages is more than four.

6. The apparatus of claim 1, further comprising a plurality of scrubbers, where the scrubber plurality is equal to or one less than the plurality of heat exchange stages.

7. The apparatus of claim 6, where the heat exchange stage plurality is three and the scrubber plurality is two.

8. The apparatus of claim 1, wherein the exchange stages are heat exchangers.

9. An apparatus for condensing multi-component fluids comprising:

a first plurality of heat exchange stages, a second plurality of scrubbers adapted to receive at least one input liquid stream and at least one input vapor stream and produce at least one output liquid stream and at least one output vapor stream, a third plurality of mixers, and a fourth plurality of splitters, where the scrubbers, the mixers and the splitter are configured to form a partially condensed stream derived from a vapor multi-component feed stream for each of the heat exchange stages, where each partially condensed stream has parameters adapted to increase a heat transfer coefficient in each of the heat exchange stages, where each of the heat exchange stages are adapted to fully condense its partially condensed stream, and where a last heat exchange stage is adapted to produce a fully condensed multi-component output stream.

10. The apparatus of claim 9, where the plurality of heat exchange stages is two.

11. The apparatus of claim 9, where the plurality of heat exchange stages is three.

12. The apparatus of claim 9, where the plurality of heat exchange stages is four.

13. The apparatus of claim 9, where the plurality of heat exchange stages is more than four.

14. The apparatus of claim 9, further comprising a plurality of scrubbers, where the scrubber plurality is equal to or one less than the plurality of heat exchange stages.

15. The apparatus of claim 14 where the heat exchange stage plurality is three and the scrubber plurality is two.

16. The apparatus of claim 9, wherein the exchange stages are heat exchangers.

17. A process for condensing multi-component fluids comprising the steps of:

splitting an input multi-component vapor stream into first and second vapor sub-streams;

forwarding the first vapor sub-stream to a lower port of a scrubber;

combining the second vapor sub-stream with a first scrubber liquid stream from a bottom port of the scrubber to form a first mixed stream;

passing the first mixed stream through a first heat exchanger where it is fully condensed forming a first condensed stream;

splitting a condensed stream into first and second condensed sub-streams, where the condensed stream is the first condensed stream;

combining the second condensed sub-stream with a first scrubber vapor stream from an upper port of the first scrubber to form a second mixed stream;

forwarding the first condensed sub-stream to a top port of the scrubber;

counterflow compositionally equilibrating the first vapor sub-stream and the first condensed sub-stream in the scrubber, and passing the second mixed stream through a second heat exchanger to form a fully condensed multi-component output stream, where the fully condensed multi-component output stream has the same or substantially the same composition as the input multi-component vapor stream, where the streams entering each heat exchanger are mixed streams having a composition designed to increase, optimize or maximize a heat transfer coefficient in each heat exchanger.

18. The process of claim 17, further comprising the steps of:

before the second splitting step, combining the first condensed stream with a second scrubber vapor stream from a port in a middle section of the scrubber to form a third mixed stream, passing the third mixed stream through a third heat exchanger where it is fully condensed fanning a second condensed stream, where the condensed stream is the second condensed stream.

19. The process of claim 17, further comprising the steps of:

before the second splitting step, splitting the first condensed stream into third and forth condensed sub-streams, forwarding the forth condensed sub-stream to a first port in a middle section of the scrubber;

combining the third condensed sub-stream with a second scrubber vapor stream from a second port in the middle section of the scrubber above the first middle port to form a third mixed stream, passing the third mixed stream through a third heat exchanger where it is fully condensed forming a second condensed stream, where the condensed stream is the second condensed stream.

20. The process of claim 17, further comprising the steps of:

before the second splitting step, combining the first condensed stream with a second scrubber liquid stream from a first port in a middle section of the scrubber to form a third combined stream, combining the third combined stream with a second scrubber vapor stream from a second port in the middle section of the scrubber above the first middle port to form a third mixed stream, passing the third mixed stream through a third heat exchanger where it is fully condensed forming a second condensed stream, where the condensed stream is the second condensed stream.

21. A process for condensing multi-component fluids comprising the steps of:

splitting an input multi-component vapor stream into first and second vapor sub-streams;

forwarding the first vapor sub-stream to a lower port of a first scrubber;

combining the second vapor sub-stream with a first scrubber liquid stream from a bottom port of a second scrubber to form a first mixed stream;

passing the first mixed stream through a first heat exchanger where it is fully condensed forming a first condensed stream;

combining the first condensed stream with a first scrubber vapor stream from a port in a middle section of the first scrubber to form a second mixed stream, passing the second mixed stream through a second heat exchanger where it is fully condensed forming a second condensed stream splitting the second condensed stream into first and second condensed sub-streams;

combining the second condensed sub-stream with a second scrubber vapor stream from an upper port of the second scrubber to form a third mixed stream;

forwarding the first condensed sub-stream to a top port of the first scrubber;

forwarding a second scrubber liquid stream from a bottom port of the first scrubber to a top port of the second scrubber, forwarding a third scrubber vapor stream from an upper port of the first scrubber to a lower port of the second scrubber, counterflow compositionally equilibrating the first vapor sub-stream and the first condensed sub-stream in the first scrubber, counterflow compositionally equilibrating the second scrubber liquid stream and the third scrubber vapor stream in the second scrubber, and passing the third mixed stream through a third heat exchanger where it is fully condensed forming a final liquid stream comprising a multi-component stream having a compositions the same or substantially the same as the input stream, where the streams entering each heat exchanger are mixed streams having a composition designed to increase, optimize or maximize a heat transfer coefficient in each heat exchanger.

22. The process of claim 21, further comprising the steps of:

before the second splitting step, combining the first condensed stream, with a second scrubber vapor stream from a port in a middle section of the scrubber to form a third mixed stream, passing the third mixed stream through a third heat exchanger where it is fully condensed forming a second condensed stream.

23. The process of claim 21, further comprising the steps of:

before the second splitting step, splitting the first condensed stream into third and forth condensed sub-streams, forwarding the forth condensed sub-stream to a port in a middle section of the scrubber;

combining the third condensed sub-stream with a second scrubber vapor stream from a port in the middle section of the scrubber to form a third mixed stream, passing the third mixed stream through a third heat exchanger where it is fully condensed forming a second condensed stream.

24. The process of claim 21, further comprising the steps of:

before the second splitting step, combining the first condensed stream with a second scrubber liquid stream from a port in a middle section of the scrubber to form a third combined stream, combining the third combined stream with a second scrubber vapor stream from another port in the middle section of the scrubber to form a third mixed stream, passing the third mixed stream through a third heat exchanger where it is fully condensed forming a second condensed stream.

25. An apparatus for condensing multi-component fluids comprising:

a first splitter valve adapted to receive a multi-component vapor feed stream and to form a first vapor feed sub-stream and a second vapor feed sub-stream, a scrubber apparatus adapted to receive the first vapor feed sub-stream at a lower port and a first portion of a first condensed stream in a top port and to produce a liquid scrubber stream at a bottom port and a vapor scrubber stream at an upper port, a first mixer valve adapted to combine the second vapor feed sub-stream and the liquid scrubber stream to form a first combined stream, a first heat exchange stage adapted to fully condense the first combined stream to form a first condensed stream, where the first combined stream has parameters adapted to increase a heat transfer coefficient of the first heat exchanger, a second splitter valve adapted to divide the first condensed stream into two portions, a second mixer valve adapted to combine a second portion of the first condensed stream and the vapor scrubber stream to form a second combined stream, a second heat exchanger adapted to fully condense the second combined stream to form a fully condense multi-component output stream, where the second combined stream has parameters adapted to increase a heat transfer coefficient of the second heat exchanger.

26. The apparatus of claim 25, wherein the scrubber apparatus includes a single scrubber.

27. The apparatus of claim 25, wherein the scrubber apparatus includes two scrubbers.

28. An apparatus for power generation comprising:

a vaporization unit adapted to fully vaporize a fully condensed multi-component working fluid stream into a fully vaporized multi-component working fluid stream;

an energy extraction unit adapted to convert a portion of thermal energy in the fully vaporized multi-component working fluid stream and to produce a spent multi-component working fluid stream, a condensation unit including:
a plurality of heat exchange stages,
at least one scrubber, and
a plurality of mixers and splitters,
the at least one scrubber, the mixers and the splitter are configured to form a partially condensed stream derived from a vapor multi-component feed stream for each heat exchange stage, where each partially condensed stream has parameters adapted to increase a heat transfer coefficient in each of the heat exchange stages, where the heat exchange stages are adapted to fully condense its partially condensed stream, and where a last heat exchange stage is adapted to produce a fully condensed multi-component output stream.

* * * * *